United States Patent [19]
Phelps

[11] 4,197,497
[45] Apr. 8, 1980

[54] AUTOMATIC POLICE EMERGENCY LOCATOR SYSTEM

[76] Inventor: Stuart W. Phelps, 3617 Cody Rd., Sherman Oaks, Calif. 91403

[21] Appl. No.: 836,230

[22] Filed: Sep. 23, 1977

[51] Int. Cl.[2] .......... G11B 5/00
[52] U.S. Cl. .......... 455/18; 179/100.1 A; 360/5; 455/66; 455/68; 455/88
[58] Field of Search .......... 325/6, 16, 66, 311, 325/55, 64, 53, 54; 179/100.1 R, 100.1 A, 100.1 C, 100.1 VC; 360/12, 69, 5, 137

[56] References Cited

U.S. PATENT DOCUMENTS

| | | | |
|---|---|---|---|
| 3,419,687 | 12/1968 | Stewart | 179/100.1 C |
| 3,699,443 | 10/1972 | Weger | 325/6 |
| 3,723,876 | 3/1973 | Seaborn, Jr. | 325/16 |
| 4,083,003 | 4/1978 | Haemmig | 325/55 |
| 4,107,611 | 8/1978 | Holcomb et al. | 325/55 |

*Primary Examiner*—Benedict V. Safourak
*Attorney, Agent, or Firm*—Clarence A. O'Brien; Harvey B. Jacobson

[57] ABSTRACT

All messages broadcast through a two-way radio by a police officer from his vehicle, are recorded on an endless tape loop of a playback recorder. An alerting signal generated by a pretuned oscillator is simultaneously recorded on the tape with each message. Playback operation of the recorder is initiated by a remote radio trigger device so as to replay and transmit the recorded message and altering signal through the vehicle radio for a timed duration.

6 Claims, 3 Drawing Figures

12VDC
Flasher
Alert Signal Gen.
Indicator
Record / Play Switching Controls
Tape Deck
Two-way Radio
Transm.
Audio
Logic Switching Module
Record
Run
Alert
Stop
FM Coded Receiver
Remote FM Transm.

AUTOMATIC POLICE EMERGENCY LOCATOR SYSTEM

BACKGROUND OF THE INVENTION

This invention relates generally to emergency radio communications for law enforcement agencies and in particular to communications amongst police officers between vehicles and a central station.

Emergency radio communication systems of the type to which the present invention relates have been heretofore proposed as disclosed, for example, in U.S. Pat. Nos. 3,290,597, 3,699,443, and 3,723,876. U.S. Pat. Nos. 3,290,597 and 3,723,876, to Denny and Seaborn, respectively, disclose systems in which emergency communication is established between a police vehicle and a central station by use of a remote radio trigger device or portable transmitter carried by the police officer when leaving his vehicle. The remote radio trigger device initiates transmitting operation of the mobile, two-way radio in the police vehicle so as to broadcast a prerecorded message. In this fashion, the police officer and vehicle may be identified and assistance requested. Such prior systems require special recording equipment and extensive modification of the mobile radio equipment in the police vehicle. Further, the messages must be prerecorded at some earlier time or date by the police officer anticipating an emergency situation. Thus, the police officer must not only anticipate an emergency situation and have sufficient time within which to record a timely message but must follow certain operational procedures dictated by the equipment.

It is therefore an important object of the present invention to provide an improved type of emergency communication system which is simple to install and use and which embodies an operational mode that is more reliable in obtaining assistance for the police officer during emergency situations, without, however, adversely affecting use of the communication system for non-emergency situations.

SUMMARY OF THE INVENTION

In accordance with the present invention, a conventional two-way radio apparatus in a police vehicle is associated with a tape deck, preferably of the plug-in cassette type, through which each message transmitted from a police vehicle radio is recorded on an endless tape loop, the message being erased each time a new message is transmitted. The last message recorded on the tape loop is thereby made available for instant replay in the event of any emergency situation requiring a call for assistance. Instant replay is initiated and broadcast through the vehicle radio to the central station and other police vehicles in response to a remote trigger signal received from a portable transmitter carried by the police officer when leaving the vehicle. To distinguish the emergency nature of such replay messages from routine messages, an altering signal is simultaneously recorded on the tape loop with each message recording. Therefore, only transmission of a recorded message is accompanied by a background alerting signal, not heard during routine voice communications.

A timer controls playback operation of the recorder triggered by the remote radio transmitter in order to affect repeated replay of the recorded message from the tape loop during a timed cycle. Logic controls prevent any interference between recording and playback operations. Special switching controls furthermore regulate flow of signals including the alerting signal from a signal generator to be recorded simultaneously with each message and a flashing signal to provide a visual indication of the operational mode of the equipment.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF THE PREFERRED EMBODIMENT

Figure 1:
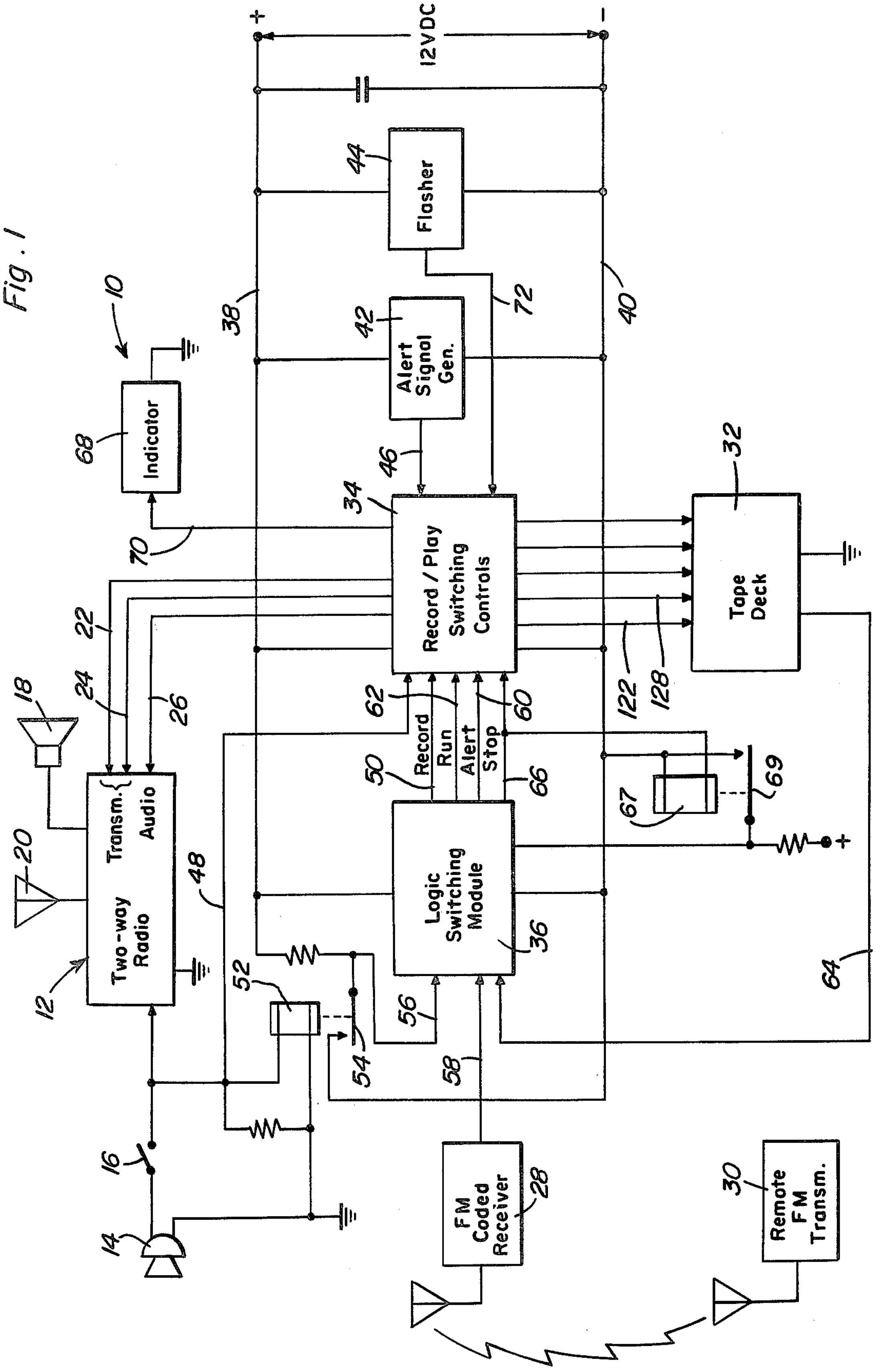
FIG. 1 is a schematic circuit diagram illustrating the system of the present invention.

Referring now to the drawings in detail, FIG. 1 illustrates the radio communication system of the present invention generally referred to by reference numeral 10. The system is associated generally with a police vehicle having two-way radio equipment generally referred to by reference numeral 12. An audio input microphone 14 is shown associated with such radio equipment having a switch 16 adapted to be closed in order to supply an audio modulating signal to the radio equipment for voice communication with a central station when the radio equipment is switched from a receiving mode to a transmitting mode. Thus, a speaker 18 is associated with the radio equipment for reception of voice communication in the receiving mode of operation while modulated RF carrier signals are transmitted from the antenna 20 during the transmitting mode of operation. The radio equipment may be automatically switched into its transmitting mode by a voltage applied across signal lines 22 and 24 and recorded audio signals fed to the appropriate secion of the radio circuit through audio signal line 26 in order to transmit recorded messages. Automatic switching of the radio equipment 12 to its transmitting mode for broadcast of recorded messages is initiated by an FM coded receiver 28 in response to reception of a triggering signal from a remote FM transmitter 30 of a small portable type adapted to be carried by the police officer.

With continued reference to FIG. 1, the system 10 includes a tape deck assembly 32 through which messages routinely transmitted through the radio equipment 12 are also recorded. Operation of the tape deck is regulated by switching controls generally referred to by reference numeral 34 which receive control signals from a logic switching module generally referred to by reference numeral 36. The logic switching module 36 and the switching controls 34 are energized by being connected across the positive and negative DC voltage lines 38 and 40 connected to a suitable source of electrical energy such as the 12-volt vehicle battery. Also connected across the voltage lines 38 and 40 is an alert signal generator 42 and a flasher unit 44. The signal generator 42 supplies an alerting signal through line 46 to the switching controls 34 in order to record such alerting signal simultaneously with the recording of each message. The audio input is fed to the radio equipment 12 from the microphone 14 upon closure of switch 16, and is also fed to the switching controls 34 through audio input line 48. The switching controls 34 are placed in a recording mode by a record signal supplied thereto through line 50 from the logic switching module 36. The logic switching module establishes the recording mode in response to closing of the microphone switch 16 causing energization of an interface relay coil 52 from the voltage source normally associated with the microphone 14. Energization of the relay coil 52 closes its normally open relay switch 54 to apply a negative voltage signal to the logic switching module through the input line 56. The system is placed in an alert mode of operation by a trigger signal supplied to the logic switching module from the receiver 28 through input line 58. An alert signal is thereby produced by the logic switching module and fed through line 60 to the switching controls. The tape deck 32 is operated during both the recording and alerting modes in response to a signal supplied to the switching controls from the logic switching module through a tape run signal line 62. The system operates in the alert mode for a limited period of time that is terminated by a stop signal from the tape deck fed by signal line 64 to the logic switching module 36. Operation is terminated through the switching controls as a result of the stop signal supplied from the logic module to the switching controls through line 66. The stop signal energizes relay 67 to close relay switch 69, applying a negative voltage to the logic switching module 36 for reset purposes. The operating mode of the system is registered by a visual indicator 68 connected to the switching controls by line 70 and receiving a signal generated by flasher 44 fed to the switching controls by line 72.

Figure 2:
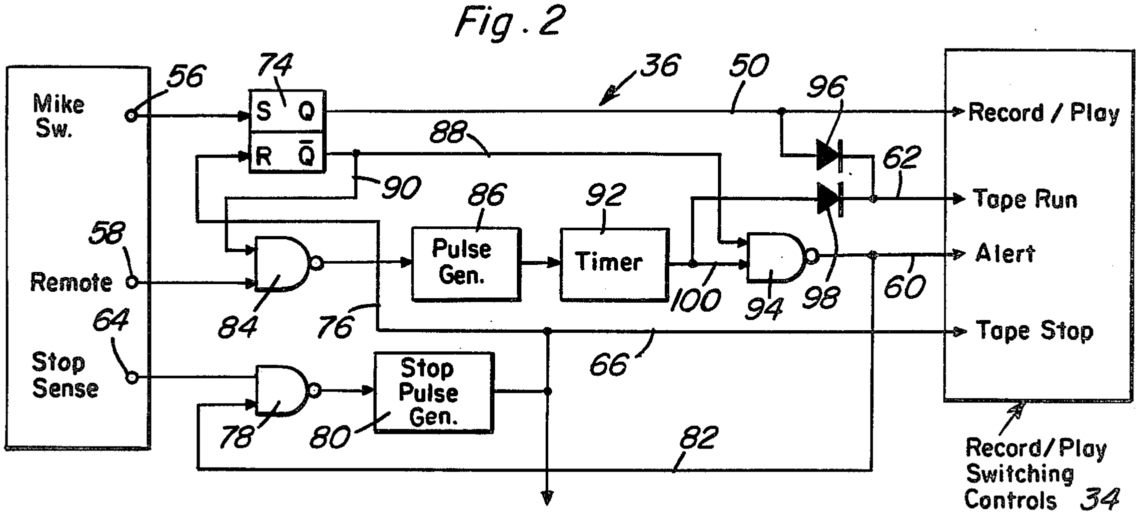
FIG. 2 is a logic circuit diagram illustrating in greater detail a portion of the system depicted in FIG. 1.

Referring now to FIG. 2, the logic switching module 36 is schmetically depicted and includes a flipflop 74 to which an input is fed through line 56 in response to microphone switch closure in order to produce the output signal in line 50 initiating a recording operation. The output in line 50 is switched off in response to a reset signal supplied to the flipflop 74 through line 76 in response to the stop signal supplied to the logic module through line 64. The stop signal in line 64 is applied to one input of a NAND gate 78 which triggers operation of a stop pulse generator 80 from which the reset pulse for flipflop 74 is derived as well as the stop signal supplied through line 66 to the switching controls as aforementioned. The stop signal in line 64 is however prevented from triggering the stop pulse generator 80 during the alert mode of operation by virtue of an inhibiting signal supplied from alert signal line 60 through line 82 to the other input to NAND gate 78. The alert mode of operation is initiated by the trigger signal in line 58 supplied to one input of NAND gate 84 which triggers operation of a pulse generator 86. This alert mode trigger signal is however inhibited by the logic level in output line 88 of the flipflop 74 during the recording operation and toward that end, an inhibit line 90 connects line 88 to the other input of NAND gate 84. The output of the pulse generator 86 initiates a timing cycle through a timer component 92 through which a signal is supplied to one input of NAND gate 94, the other input of this NAND gate being connected to the output line 88 of flipflop 74. The output of NAND gate 94 supplies the alerting signal through line 60 to the switching controls 34. As aforementioned, the tape deck 32 is operated during both the recording and alerting modes of operation by a signal supplied through line 62 to the switching controls. Therefore, both the recording signal line 50 and the output line 100 of timer 92 are connected by diodes 96 and 98 to the tape run signal line 62.

Figure 3:
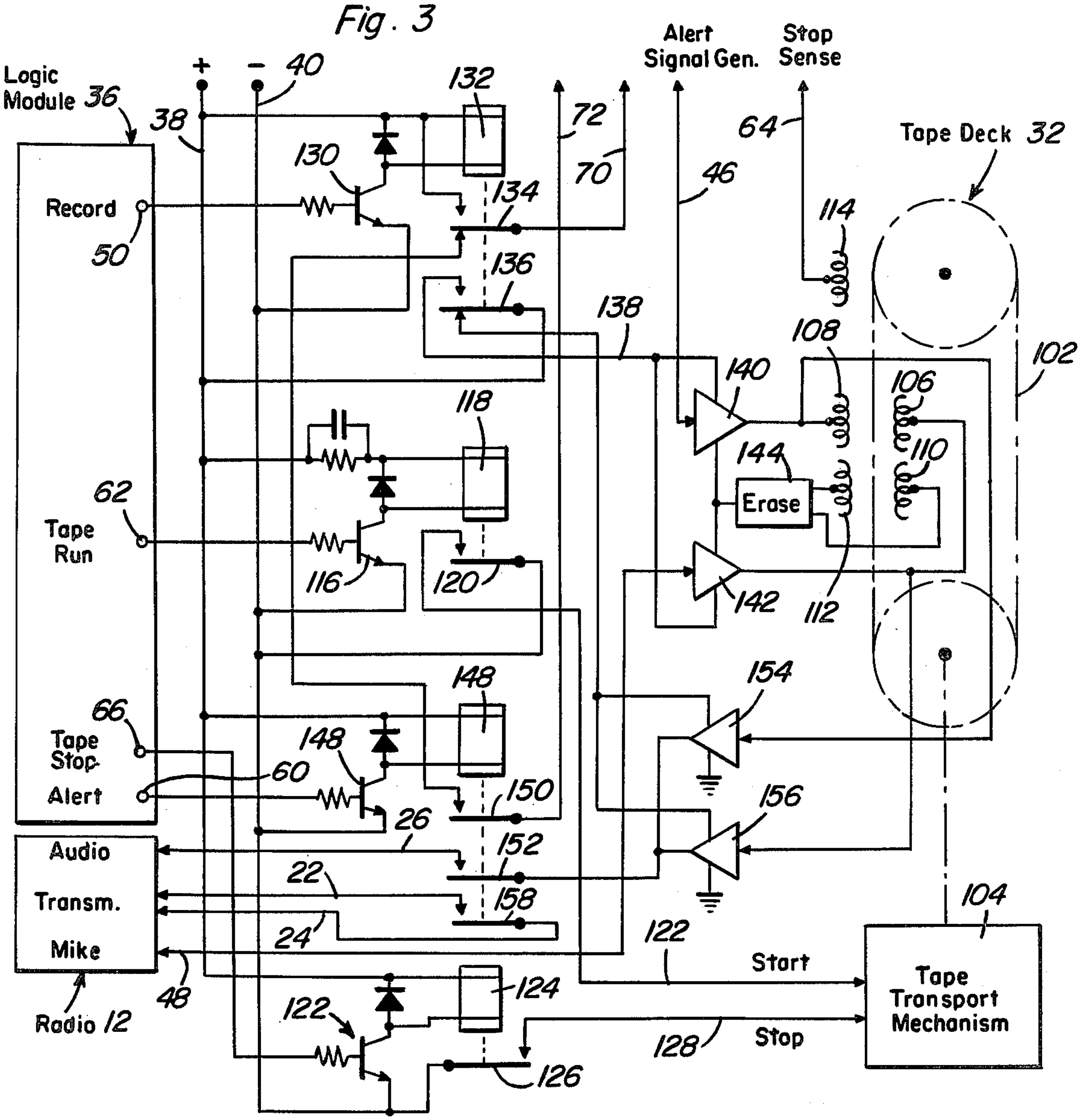
FIG. 3 is a more detailed circuit diagram illustrating another portion of the system depicted in FIG. 1.

Referring now to FIG. 3, it will be noted that the switching controls 34 control operation of the tape deck 32 which includes an endless tape loop 102 as diagrammatically illustrated. The tape loop is driven by a conventional tape transport mechanism 104. In one embodiment of the invention, two tracks are provided on the tape loop for respectively recording voice messages and an alerting signal. Thus, a recording and playback head 106 is operatively positioned relative to one track on the tape to establish one recording and playback channel while a second recording and playback head 108 is positioned in operative alignment with the other track to establish a second playback and recording channel. Erase heads 110 and 112 are also respectively aligned with the two tracks. The tape is provided at one location with a metal coating to establish a stop signal detected by a sensing head 114 to which the stop-sense signal line 64 is connected.

A Tape run signal in line 62 is operative through transistor 116 to energize a tape run control relay coil 118 causing its normally open relay switch 120 to close in order to apply a signal to the tape transport mechanism through start signal line 122. Operation of the tape transport mechanism is thereby initiated for both the recording and playback operations. When the sensing head 114 detects the stop signal on the tape, the stop-sense signal in line 64 is operative through the logic switching module 36 to supply a stop signal in line 66 which is operative through transistor 122 to energize the stop control relay coil 124. Energization of the relay coil 124 closes its normally open relay switch 126 in order to apply a negative signal to the stop signal line 128 to thereby interrupt operation of the tape transport mechanism 104.

Recording operation is initiated by a signal in line 50 which is operative through transistor 130 to energize the record control relay coil 132. Relay switch 134 is thereby actuated in order to connect the positive voltage line 38 to the indicator 68 through line 70 in order to visually signify recording operation. At the same time, relay switch 136 as shown in FIG. 3 is actuated to apply voltage from the positive voltage line 38 through line 138 to recording amplifiers 140 and 142 thereby rendering these amplifiers operative. The alerting signal from signal generator 42 is applied through line 46 to the input of recording amplifier 140, the output of which is connected to the tape head 108 for recording the alerting signal on the tape. At the same time, the audio input from the microphone 14 is applied through line 48 to the input of amplifier 142, the output of which is connected to the tape head 106 aligned with the other track on the tape for recording the voice communication thereon. The erase heads 110 and 112 are connected to the erase circuit 144 which in turn is connected to the bias terminal of the recording amplifiers 140 and 142 in order to effect erasure of all previous signals on the tape during the reco-ding operation. Thus, each time voice communication originates from the microphone 14 of the radio equipment in a police vehicle, it is recorded on the endless tape loop 102 together with an alerting signal.

The alert operation of the system as aforementioned is initiated by means of the alert signal in line 60 which is operative through transistor 146 to energize control relay 148. Energization of the relay coil 148 is operative to close its normally open relay 150 to thereby connect the output line 72 from the flasher unit 44 to the indicator signal line 70 through relay switch 134 associated with the deactivated record control relay coil 132. A flashing alert indication is thereby established through the indicator 68 during the alert mode of operation. At the same time, normally open relay switch 152 is closed in order to connect the output amplifiers 154 and 156 to the audio signal line 26. The inputs to these amplifiers are respectively connected to the tape heads 106 and 108. Thus, the message and alerting signal recorded on the two tracks of the tape are respectively amplified by the amplifiers 154 and 156 and supplied to the audio section of the radio equipment 12 through line 26 for broadcast purposes. The normally open relay switch 158 is also closed by energized relay coil 148 to switch the radio equipment 12 to the transmitting mode through lines 22 and 24. Both the voice communication and the alerting signal are thereby transmitted to the central station and other police vehicles in order to obtain assistance for the police officer. The output amplifiers 154 and 156 are rendered operative by supply of positive voltage thereto through the relay switch 136 in its position corresponding to the deactivated condition of record control relay 132.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an emergency communication system having a mobile two-way radio, remote-controlled means for switching said radio from a receiving mode to a transmitting mode to broadcast messages, a message recorder and player assembly rendered operative to alternately execute recording and replay operations, and timer means connected to the remote-controlled means for rendering the recorder and player assembly operative during a timing cycle of preselected duration to replay the recorded messages under said replay operation for broadcast through the radio in the transmitting mode; the improvement residing in switching control means for simultaneously rendering the recorder and player assembly operative to record said messages while supplying a corresponding audio modulating signal to the radio for broadcast of the messages during the recording operations, an alert signal generator, and means connecting the signal generator to the recorder and player assembly for recording an alerting signal simultaneously with said recording of the messages, whereby the alerting signal distinguishes the broadcast of the messages during the replay operations from the broadcast of the messages during the recording operations.

2. The combination of claim 1 wherein said switching control means includes logic means triggered by said remote-controlled means for initiating operation of the timer means and preventing operation of the timer means during said recording operations.

3. For use with a two-way radio switched from a receiving mode to a transmitting mode by a remote-controlled device for broadcast of recorded audio signals from a recorder-player, audio input means connected to the radio and the recorder-player for simultaneous broadcast and recording of said audio signals by the radio and the recorder-player respectively, alerting means connected to said recorder-player for recording an alerting signal simultaneously with said recording of the audio signals, and means triggered by said remote-controlled device for operating the recorder-player in a playback mode to broadcast the recorded alerting signal simultaneously with the recorded audio signals.

4. The combination of claim 3 including time-controlled means connected to the recorder player for limiting the duration of the playback mode of operation to a timing cycle.

5. The combination of claim 4 including logic means for preventing operation of the remote-controlled device during the recording mode of operation of the player.

6. The combination of claim 3 including logic means for preventing operation of the remote-controlled device during the recording mode of operation of the player.

* * * * *